United States Patent [19]

Desai et al.

[11] Patent Number: 5,360,627
[45] Date of Patent: Nov. 1, 1994

[54] REDUCED FAT SHORTENING SUBSTITUTE FOR BAKERY PRODUCTS

[75] Inventors: Girish N. Desai, Ellicott City, Md.; Janos Bodor, Rijswijk, Netherlands

[73] Assignee: Van den Bergh Foods Co., Division of Conopco, Inc., Lisle, Ill.

[21] Appl. No.: 982,929

[22] Filed: Nov. 30, 1992

[51] Int. Cl.$^5$ .............................................. A23D 9/00
[52] U.S. Cl. ..................................... 426/606; 426/602; 426/804
[58] Field of Search ................. 426/606, 578, 602, 804

[56] References Cited

U.S. PATENT DOCUMENTS

| | | | |
|---|---|---|---|
| 3,563,766 | 2/1971 | Matsui | 426/606 |
| 3,782,970 | 1/1974 | Tomita et al. | |
| 3,886,292 | 5/1975 | Kissell et al. | |
| 3,943,259 | 3/1976 | Norris | 426/606 |
| 4,273,795 | 6/1981 | Bosco et al. | |
| 4,279,941 | 7/1981 | Bosco et al. | |
| 4,335,157 | 6/1982 | Varvil | 426/606 |
| 4,351,852 | 9/1982 | Rule et al. | |
| 4,424,237 | 1/1984 | Wittman, III | |
| 4,456,626 | 6/1984 | Nelson | 426/606 |
| 4,461,777 | 7/1984 | Murase | 426/602 |
| 4,668,519 | 5/1987 | Dartey et al. | |
| 4,678,672 | 7/1987 | Dartey et al. | |
| 4,818,553 | 4/1989 | Holscher et al. | |
| 4,917,915 | 4/1990 | Cain et al. | |
| 5,178,897 | 1/1993 | Tanaka et al. | |
| 5,246,727 | 9/1993 | Finkel | 426/606 |

FOREIGN PATENT DOCUMENTS

| | | | |
|---|---|---|---|
| 265003 | 4/1988 | European Pat. Off. | |
| 1442001 | 10/1968 | Germany | |
| WO9218015 | 10/1992 | WIPO | 426/606 |

OTHER PUBLICATIONS

Van den Bergh Foods, Inc., Product Data Sheet: FIG. 279B "EC TM -25 Emulsifier System", 1991.
Sobcynska, D., et al., "Replacement of Shortening by Maltodextrin-Emulsifier Combinations in Chocolate Layer Cakes", Cereal Foods World, vol. 36, No. 12 (Dec. 1991), pp. 1017-1026.
"Potato Maltodextrin Gels Low-calorie Baking Opportunities", Prepared Foods, Oct. 1980, p. 88.
"Maltodextrins and Corn Syrup Solids", Chilton's Food Engineering Master, p. 50.
Avebe America Inc., Product Information Ref. No. 05.12.34.188 EU, Paselli SA2 TM, Apr. 1991.
National Starch and Chemical Corporation, Technical Service Bulletin 34888-500, N-Oil ®.
National Starch and Chemical Corporation, Technical Service Bulletin 34388-508, Instant N-Oil ®.
Van den Bergh Foods, Inc., Product Data Sheet IN-D-230D: Creamtex ®.
Hartnett et al., "Emulsifier Systems Facilitate Ingredient Substitutes in Cake". Food Product Development, vol. 13, No. 10 (Oct. 1979), pp. 60-64.
Pfizer Inc., Litesse TM Product Prochure.
Abstract of Japanese Patent 01218537.
Abstract of Japanese Patent 5118405.

Primary Examiner—Carolyn Paden
Attorney, Agent, or Firm—Rimma Mitelman

[57] ABSTRACT

An emulsion for use as a shortening substitute is disclosed to contain from about 10% to about 40% of a fat phase containing a triglyceride and emulsifier containing propylene glycol monoester of fats and fatty acids; from about 60% to about 90% of an aqueous phase containing 5% to about 30% of a viscosifier and 10% to 50% of a polyol humectant. The viscosifier may include a starch, a starch derivative, or a gum. This plastic emulsion is used to make a reduced fat shortening substitute in bakery products.

15 Claims, 1 Drawing Sheet

REDUCED FAT SHORTENING SUBSTITUTE FOR BAKERY PRODUCTS

FIELD OF THE INVENTION

The present invention relates to a plastic emulsion which is employed as a reduced fat shortening substitute in bakery products.

BACKGROUND OF THE INVENTION

A shortening is a plastic fat, which is a mixture of triglycerides having widely different melting points. Fat crystals in a shortening are held together by internal cohesive forces and liquid oil is enmeshed in the structure. Shortenings are used in cakes to impart tenderness, texture, and crumb and promote increase in volume by shortening the strands of gluten, which in the absence of fat would form a tough meshwork structure. Shortenings assist the leavening in the oven of the cake of nonfermented doughs, where rapid rising by means of gas from baking powder and vapour is required. Shortening also acts as a foaming/whipping agent in the aeration process of batters and doughs to achieve the required volume of the baked products. Emulsifiers, such as lecithin, mono- and diglycerides of fatty acids, propylene glycol mono- and diesters of fatty acids, diacetyl tartaric acid esters of mono- and diglycerides of fatty acids may be used in conjunction with shortenings. The emulsifiers are included in order to provide tenderization, anti-staling, lubrication, and aeration of doughs. Various emulsifiers included in bakery products either contain triglycerides, and/or are derived from triglycerides, thus contributing to the fat content in the cake.

Commercially available emulsified or stabilized shortenings contain 2–5% of emulsifier, except that when the emulsifier is mono- and diglyceride higher levels, i.e., 6%, are included.

In light of the rising consumer demand for low fat, low calorie products, food scientists are faced with a challenging task of producing a baked product which is tender and breaks apart easily and has a good height but which contains a reduced amount of fat. Although the fat content of the cake may be lowered by employing fat blends, e.g. margarines containing 16–20% water, a further reduction in fat is desirable. If fat is replaced with an increased amount of water, however, a number of problems are observed including weakening of the batter and decreased aeration and cake volume.

U.S. Pat. No. 4,351,852 (Rule et al.) discloses a cake batter including flour and sugar intimately blended with a mono- and diglyceride emulsifier, the emulsifier having specifically defined di- and triglyceride levels. The emulsifier is marketed under the trademark Dur-lo ® (Van den Bergh Foods Corp.). The emulsifier may be employed in an amount of 5% or more with a conventional amount of shortening, or the emulsifier may be employed alone in an amount of 15% (flour weight basis), with no additional lipids or other emulsifiers. Rule et al. disclose the actual triglyceride content in a cake batter or mix can be as low as about 3.5% (flour weight basis).

U.S. Pat. No. 4,818,553 (Holsher et al.) discloses a method of preparing bakery products which involves combining a water-in-oil emulsion to serve as a shortening and at least one further component selected from flour, eggs, leavening agents, sugar, and mixtures of these materials. The emulsion contains 15–70% fat phase and 5–60% by weight, based on the total emulsion, of a water-dissolved humectant. The humectant is selected from the group consisting of glucose, fructose, mannose, galactose, talose, lactose, sucrose, maltose, maltodextrins, polydextrose, glycerol, sorbitol, propylene glycol, and mixtures thereof. The fat phase may optionally include an emulsifier, such as mono- and diglyceride mixture, or mixtures of mono- and diglycerides with lecithin. Typically, small amounts (i.e., below 0.5% by weight of the emulsion) of the emulsifier are included. It is said that it is important for the fat phase to constitute a continuous phase of the emulsion, since "water-continuous emulsions cannot be used satisfactorily in traditional cake preparation involving first aerating the emulsion with sugar to produce an aerated cream which is subsequently mixed with eggs and flour to produce the batter." Examples of the Holscher patent describe water-in-oil emulsions containing at least 40% fat. Unfortunately, at particularly low fat levels, i.e. at fat levels below about 40%, preparation of water-in-oil emulsion becomes difficult: any minor fluctuation in processing, e.g. cooling, can change the emulsion to oil-in-water. Therefore, an oil-in-water rather than a water-in-oil emulsion is desirable which could be used as a low fat replacement for shortening.

Accordingly, it is an object of the present invention to provide a reduced fat shortening substitute while avoiding the above-mentioned drawbacks.

It is another object of the invention to provide a reduced fat oil-in-water emulsion which can be used as a shortening replacement.

It is another object of the invention to provide a shortening substitute which may be employed to attain up to 80% fat reduction in a baked product.

It is yet another object of the invention to provide a shortening replacement product which is similar to shortening in texture, appearance and functionality, yet contains no more than 40% fat, or preferably no more than about 20% fat.

It is still another object of the invention to lower the fat content in a baked product without adversely affecting the properties of a baked product and without altering the recipe for the preparation of the baked product.

These and other objects of the invention will become more apparent from the detailed description and examples which follow.

SUMMARY OF THE INVENTION

An emulsion for use as a shortening substitute in the preparation of a bakery product, the emulsion including: from about 10% to about 40% of a fat phase comprising
 (a) a triglyceride;
 (b) at least 3%, by weight of the emulsion, of an emulsifier, the emulsifier comprising at least 45%, by weight of the emulsifier, of propylene glycol monoester of fats and fatty acids; and
 and from about 60% to about 90% of an aqueous phase comprising
 (c) from about 5% to about 30% of a viscosifier selected from the group consisting of a starch, a starch derivative, a gum, and mixtures thereof; and
 (d) from about 10% to about 50% of a polyol humectant.

Reduced fat shortening substitutes according to the present invention are used in the same amount as a full-fat shortening or a bakery margarine, without loss of functionality or adjustment of the recipe.

DETAILED DESCRIPTION OF THE INVENTION

Figure 1:
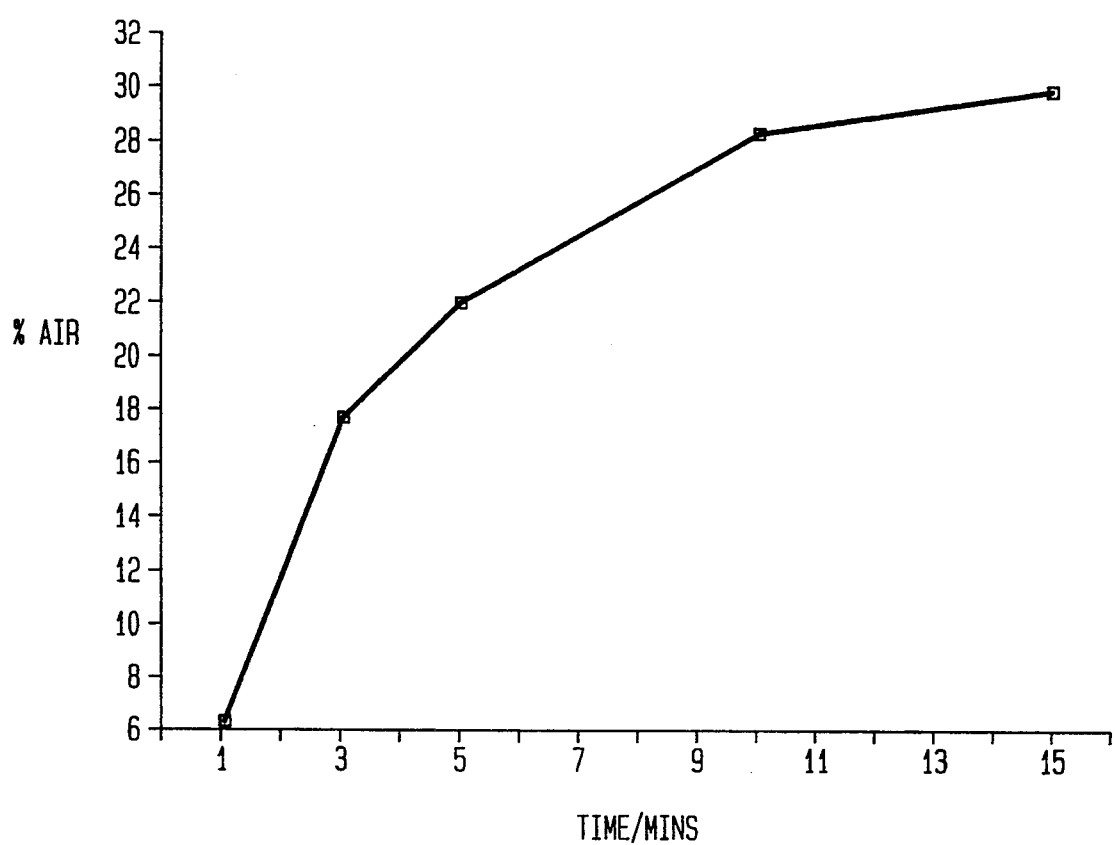

A shortening substitute according to the present invention contains a fat phase and an aqueous phase. The fat phase of the shortening substitute contains, as a first essential ingredient, a triglyceride. The triglyceride included in the shortening substitute according to the present invention is any triglyceride typically employed in the manufacture of bakery products. The invention is based, in part, on the discovery that the amount of the triglyceride necessary to obtain a bakery product may be substantially reduced by virtue of the inclusion in the fat phase of the shortening substitute of the invention at least 3% (by weight of the shortening substitute) of specific emulsifiers.

Generally, triglycerides suitable for use in the present invention have a plastic consistency over a fairly wide range of temperatures and contain a large amount (e.g., up to 40%) oils liquid at 10° C. (substantially free from crystallized fat at said temperature), the remainder consisting of fats melting within a temperature range preferably varying from about 24° C. to about 54° C. (75.2°–129.2° F.).

The solid fat index of triglycerides suitable for use in the present invention is generally as follows:

|        |       | Preferred | Most preferred |
|--------|-------|-----------|----------------|
| 50° F. | 20–70 | 25–50     | 28–31          |
| 70° F. | 10–60 | 20–30     | 20–22          |
| 92° F. | 5–50  | 10–20     | 14–16          |
| 104° F.| 1–20  | 5–15      | 9–11           |

The examples of suitable triglycerides include but are not limited to:

| | |
|---|---|
| 1. Hydrogenated whale oil, having a melting point ranging from 44 to 46° C. | 20% |
| Hydrogenated whale oil, having a melting point of 34° C. | 30% |
| Coconut oil, having a melting point of 24° C. | 20% |
| Soybean oil | 20% |
| 2. Premier jus, having a melting point of 46° C. | 25% |
| Coconut oil, having a melting point of 24° C. | |
| Soybean oil | 40% |
| 3. Hydrogenated palm oil, having a melting point of 42° C. | 25% |
| Palm oil, having a melting point of 42° C. | 30% |
| Hydrogenated groundnut oil, having a melting point of 34° C. | 20% |
| Soybean oil | 25% |
| 4. Hydrogenated groundnut oil, having a melting point of 42° C. | 25% |
| Lard, having a melting point of 38° C. | 20% |
| Oleomargarine, having a melting point of 30° C. | 35% |
| Soybean oil | 20% |
| 5. Hydrogenated groundnut oil, having a melting point of 34° C. | 70% |
| Coconut oil, having a melting point of 34° C. | 10% |
| Soybean oil | 20% |
| 6. Hydrogenated groundnut oil, having a melting point of 42° C. | 30% |
| Coconut oil, having a melting point of 24° C. | 20% |
| Palmkernel oil, having a melting point of 28° C. | 20% |
| Soybean oil | 30% |

The preferred triglycerides are hydrogenated and/or unhydrogenated vegetable oils, such as corn oil, peanut oil, coconut oil, palm kernel oil, palm oil, rapeseed oil, sunflower oil, safflower oil, and soybean oil, and mixtures thereof.

Most preferred triglycerides to be employed in the shortening substitute according to the invention are marketed by Van den Bergh Foods, Inc. under trademarks Creamtex®, Code 321®, Durola Select®, Diamond D-40® and Diamond D-42®.

Creamtex is a partially hydrogenated vegetable oil (soybean, cottonseed), having about 88–92% hydrogenated soybean oil, a Wiley Melting Point of 111°–119° F., and an SFI 33 maximum at 50° F., 22 maximum at 70° F., 16 maximum at 92° F., and 8 min. at 104° F.

Code 321® is a partially hydrogenated soybean oil, having a Wiley Melting point 95°–99° F., and an SFI 34–43 at 50° F. and 3–8 at 92° F.

Durola Select® is a partially hydrogenated canola oil, having an SFI of 52 min at 50° F., 34 min at 70° F. 25 min at 80° F., 10 min at 92° F., and 8 max at 100° F.

Diamond D-42® is a partially hydrogenated vegetable oil (cottonseed oil and soybean oil), having a Wiley melting point 110°–119° F. and an SFI of 40–47 at 50° F., 26–33 at 70° F. 13–19 at 92° F., and 5–10 at 104° F.

Diamond D-40® is a partially hydrogenated vegetable oil, having a Wiley Melting Point of 112–117° F., having a solid fat index of 24–30 at 50° F., 13–19 at 70° F., 7–13 at 92° F. and 5 min. at 104° F.

The second essential ingredient included in the fat phase of the shortening substitute according to the invention is an emulsifier. The emulsifier suitable for use in the present invention contains propylene glycol monoester of fats and fatty acids, typically in the amount of at least 45%, preferably in the amount of from 50% to 70% by weight of the total emulsifier. Further, at least about 3% of the total emulsifier (by weight of the shortening substitute) is included in the shortening substitute of the invention. Typically, the amount of the emulsifier in the shortening substitute of the invention ranges from 3% to 8%. Preferably, in order to achieve the desired eating and baking quality at an optimum cost, the amount of the emulsifier is from 4% to 7%, most preferably from 5% to 7%.

The emulsifier is a major component of the fat phase, not merely an additive. It has been found, as part of the present invention, that the ratio of the emulsifier to the triglyceride is typically in the range of from 1:4 to 1:1, preferably in the range of from 1:3 to 1:1, and optimally is 1:2.3, in order to obtain improved specific volume in a baked product. Commercially available emulsifiers sometimes contain triglyceride, in which case the triglyceride weight is subtracted from the total weight above-defined ratios or amounts of the emulsifier.

Additional emulsifiers, besides propylene glycol monoester, may be included in the fat phase of the shortening substitute of the invention. Typically, the emulsifier will also contain a minor amount of propylene glycol diester of fats and fatty acids. Preferably, the emulsifier included in the shortening substitute of the invention contains, mono- and diglycerides and lecithin in addition to propylene glycol mono- and diesters of fats and fatty acids. The preferred emulsifier included in the shortening substitute of the invention is marketed by Van den Bergh Foods Corporation under trademark EC-25®. EC-25® has a capillary melting point of 90°–100° F., and is a mixture of propylene glycol mono- and diesters of fats and fatty acids, mono- and diglycerides, lecithin and triglyceride. Examples of other emulsifiers which may be included in the shortening substitute of the invention include but are not limited to polyol esters and polyesters of fatty acids (e.g., sucrose polyesters and polyglycerol esters), lactylic acid esters of fatty acids, polysorbates (such as polyoxyethylene sorbitan distearate, polyoxyethylene sorbitan monostearate, polyoxyethylene isosorbide dipalmitate, polyoxyethylene sorbitan tristearate as well as other similar ethoxylated fatty acid esters of ethoxylated hexitols, hexitans and isohexides.

The aqueous phase of the shortening substitute of the invention includes a viscosifier and a humectant, as necessary ingredients.

Viscosifiers suitable for use in the present invention are selected from starches, starch derivatives, and gums.

Starches suitable for use in the present invention are native starches. These include but are not limited to corn, grain sorgum, wheat, rice, root and tuber, potato, tapioca, waxy starches and high amylose starches.

Starch derivatives that may be employed in the shortening substitute according to the present invention are exemplified but not limited to acid modified starches, dextrins, oxidized starches, cross bonded starches and starch derivatives such as starch acetate, starch phosphate, starch succinate and hydroxy propyl starch and pregelatinized starches.

Various gums that may be employed in the present invention are exemplified but not limited to guar gum, locust bean gum, sodium alginate, propylene glycol alginate, xanthan gum, cellulose gum, and mixtures thereof.

In the preferred embodiment of the invention the viscosifier is a low-dextrose equivalent maltodextrin manufactured by the enzymatic conversion of potato starch (Paselli SA2 ®), a tapioca dextrin (N-oil ®), and pregelatinized tapioca dextrin (N-oil Instant ®). Optimum results were obtained with pregelatinized tapioca dextrin.

The viscosifier is employed in the present invention in the amount of from 5% to 30% (by weight of the shortening substitute), preferably in order to achieve the final product consistency similar to the consistency of shortening, the amount of the viscosifier is in the range of from 10% to 20%, optimally the amount is from 14% to 18%.

The second essential ingredient in the aqueous phase of the shortening substitute of the invention is a humectant. Generally speaking, a humectant is a substance which depresses the water activity of the aqueous phase. The humectant will generally effect the decrease in water activity to a value below 0.96, and preferably ranging from 0.70-0.90.

Humectants suitable for use in the present invention are described in the commonly assigned U.S. Pat. No. 4,818,553, which is incorporated by reference herein. Suitable humectants include but are not limited to glucose, fructose, mannose, galactose, talose, lactose, sucrose, maltose, maltodextrins, polydextrose, glycerol, sorbitol, propylene glycol. Increased specific volume and the best cake texture were obtained when hydrolyzed product of starches was used, e.g. hydrolyzed corn starch such as high fructose corn syrup. High fructose corn syrup is the most preferred humectant according to the present invention. Shortening substitues of the present invention which contained a mixture of EC-25 ® emulsifier and HFCS resulted in optimum quality reduced fat cakes. High fructose corn syrup contains a mixture of glucose, fructose and other higher molecular weight saccharides. Higher saccharides, are anhydrides of one or more monosaccharides in which a large number of units are combined.

The aqueous phase of the shortening substitute may further contain salt, acids, and preservatives.

The shortening substitute may further contain, colors (e.g., b-carotene), and flavors.

The fat phase of the shortening substitute according to the present invention constitutes from 10% to 40% of the shortening substitute. Preferably in order to attain substantial fat reduction in a baked product yet preserve the functionality of the shortening, the fat phase content of the shortening substitute is from 15% to 35%, most preferably from 20% to 25%.

The shortening substitute of the present invention may be in the form of a water-in-oil or oil-in-water emulsion. According to the present invention, oil-in-water emulsions are preferred in order to improve the quality cake, while also easing the manufacture of the shortening substitute. It has also been found the use of water-continuous shortening substitutes resulted in a cake that was more moist (and stayed moist, even after one day) compared to cakes prepared with oil-continuous emulsion.

Shortening substitutes according to the present invention are prepared according to margarine manufacturing methods. Generally, the triglyceride, the emulsifier, and any other oil-soluble ingredients are heated and mixed to obtain an oil phase. A viscosifier, a humectant, and other water-soluble ingredients are dissolved in water and heated to obtain an aqueous phase. Aqueous phase is then added to the oil, preferably slowly and with constant stirring. The resulting emulsion is processed through a scrape surface heat exchanger (A-units) and then through a crystallizer to obtain a shortening substitute of uniform texture. The shortening substitute is stored at a refrigerator temperature.

The shortening substitute of the present invention is used in the preparation of doughs and batters in the same amount as any shortening would be used. Typically, from 10% to 150% of the shortening substitute (by weight of the flour) would be employed. All the desired properties: namely, excellent cake volume, grain, texture, and structure are obtained, yet the fat content in the cake formulation may be substantially reduced.

The shortening substitute of the present invention can be used without any adaptation or modification of the conventional recipes. In other words, the shortening substitute of the present invention may be used by a customer or by a baker as if it were a conventional cake shortening or margarine.

A bakery product, in particular, a cake, may be prepared by methods known in the art by mixing in effective amounts additional ingredients typically employed in cake compositions, such as cake flour, salt, baking powder, a protein such as milk powder, a sweetening agent such as sugar, water, whole eggs, or egg white, and flavor. Preferably the cake is prepared with eggs or egg yolk to obtain a maximum specific volume. The preferred bakery product prepared in accordance with the present invention is a reduced fat pound cake.

The inventive shortening substitute has a soft texture similar to conventional bakery shortenings. The shortening is easy to blend. The batter may be prepared by creaming the shortening substitute with sugar and then adding the rest of the ingredients; or all the ingredients including the shortening substitute may be admixed simultaneously.

Although typically used in the preparation of batters and doughs, the shortening substitute according to the present invention may be used in the preparation of icings (as illustrated in Example 7, the shortening has sufficient air uptake, and thus may be employed for making icing or any other product which requires air).

The following specific examples further illustrate the invention, but the invention is not limited thereto.

METHODS

Shortening Preparation

Aqueous Phase preparation: Starch and other water soluble ingredients were dissolved in water and heated to 80° C.

Oil Phase preparation: Creamtex ® and emulsifiers were heated to 45° C. and mixed.

Aqueous phase was added to the oil phase slowly, with constant stirring to obtain an emulsion.

Processing: The emulsion was cooled by passing it through a scrape surface heat exchanger (A-units) and then through a crystallizer (C-unit) to give a shortening of uniform texture.

Storage: The resulting products were stored at refrigerated temperature.

Pound Cake Evaluation

A detailed recipe and procedure for making pound cake was as follows:

Formula:

| | |
|---|---|
| 200 GM | Cake Flour |
| 200 GM | Whole Eggs (Fresh/Frozen) |
| 200 GM | Sugar Granulated |
| 200 GM | Margarine/Reduced Fat Emulsion |
| 2 GM | Double Acting Baking Soda |

Method for cake baking and evaluation:
Put sugar in a N-50 Hobart mixing bowl
Add margarine/reduced fat emulsion
Using paddle, mix for 1 min. at speed :1:
Scrape the bowl. Mix for 1 min. at speed :2.
Add eggs, slowly, while mixing.
Mix for 1 min. at speed :1:
Scrape. Mix 1 min. at speed :2:
Add flour.
Mix for 1 min. at speed :2:
Final scrape.
Mix for 1 min. at speed :2:
Measure specific gravity of the batter.
Scale 650 GM. of batter in to a greased pound cake baking pan.
Bake at 350° F. for about 50–55 minutes.
Cool and Weigh the cake to measure bake loss.
Measure Volume to calculate Specific volume.
Evaluate for eating characteristic.
Keep some cake, and evaluate after 48–72 hr. again.

Cake batter specific gravity was measured by determining the weight of the batter in to a cup of known volume. Reporting it as a ratio of weight/volume.

Specific volume of a cake was determined by measuring the volume of a cake and dividing that by weight of the cake.

EXAMPLE 1

Pound cakes prepared with various emulsions were evaluated.

Pound cake 1 was prepared just with margarine (80% fat), as a control.

Pound cake 2 was prepared with emulsion 2. Emulsion 2 contained 35% margarine and 65% starch slurry. The starch slurry contained 25% starch. The starch employed was Paselli SA2 ®.

Pound cake 3 was prepared with Emulsion 3. Emulsion 3 contained 35% margarine and 65% starch slurry (as in Emulsion 2) plus 25 grams of EC-25 ® were added per 400 grams of the emulsion (the total size of the emulsion was 425 g).

EC-25 ® contains 20–25% monoglyceride, 34–38% propylene glycol monoester, 3% lecithin and the balance of triglycerides. Thus, the total emulsifier content of EC-25 ® is 57–66%. Thus, the emulsifier content in Emulsion 3 was 14–16.5 g, or 3.3–3.8%.

Pound cake 4 was prepared with emulsion 4, containing 35% Creamtext ®, 1.96% EC-25 ®, and 65% starch slurry (as in Emulsion 2). Emulsion 4 contained 1.12–1.3% emulsifier.

The following results were obtained:

| Cake | % Fat | Emulsion % Emulsifier | Specific Volume |
|---|---|---|---|
| 1 | 80 | 13 | 2.56 |
| 2 | 35 | — | 1.77 |
| 3 | ca. 36.5 | 3.3–3.8 | 2.26 |
| 4 | ca. 35 | 1.1–1.3 | low* |

*Generally, specific volume below 1.50 was considered low, specific volume in the range of from 1.5 to 2.0 was considered medium, and the specific volume of 2.5 was considered high. At least medium specific volume is required, and high specific volume is preferred.

The example illustrates that the addition of 3.3–3.8% of emulsifier (cake 3) substantially improved specific volume of the cake, while the addition of 1.1–1.3% of the emulsifier (cake 4) was insufficient to make up for reduced level of fat. Also, inclusion of 3.3–3.8% of the emulsifier (cake 3) resulted in the increase in specific volume compared to the specific volume of cake 2, which did not include any emulsifier. Inclusion of 1.1–1.3% of the emulsifier (cake 4), however, did not result in the increase in specific volume.

EXAMPLE 2

Pound cakes were prepared based on emulsions containing 35% Creamtex ® and 65% starch slurry, the starch slurry containing 25% Paselli SA-2 ® (based on the weight of the slurry). Various amounts of the emulsifier (EC-25 ®) were admixed into the batter. The following results were obtained:

| Cake | % Emulsifier | Specific Volume |
|---|---|---|
| 5 | 2.2–2.5 | 2.28 |
| 6 | 4.2–4.8 | 2.45 |
| 7 | 6.3–7.3 | 2.46 |

The example illustrates that a cake prepared with 2.5% emulsifier (cake 5) had medium specific volume, whereas cakes 6 and 7, containing more than 3% emulsifier, had a high specific volume of about 2.5.

For Examples 3–5, the emulsions were made up on microvotator and always kept in refrigerator at 45° F. overnight prior to cake evaluation. A margarine was made up using Creamtex ® and was used as a control. The formulation for the margarine is listed in Table 1.

EXAMPLE 3

35% Fat (Water-in-Oil and Oil-in-water)

A shortening substitute was prepared (Shortening A) containing 35% fat phase. The formula is listed in Table 1. The shortening was prepared as described above. Total amount of the amount of the emulsifier (mixture of mono- and diglycerides and lecithin) in Shortening A was 3.4%.

Pound cake made with this shortening lacked volume, the grain was very close and the cake had very dry mouthfeel. The air intake in the batter was very low.

Based on this observation and some investigations the formula was modified to include different emulsifiers (EC-25 ®) and replace sugar with High Fructose Corn Syrup (HFCS). The formula with EC-25 ® and HFCS is listed in Table 1 as Shortening B. Shortening B contained 11.4–13.2% total emulsifier.

During the processing (rotating) of Shortening B, depending upon the cooling process and crystallizer speed, two types of emulsions were obtained: water-in-oil or oil-in-water. Both emulsions were collected and evaluated for pound cake making. Both emulsions made acceptable cakes but the oil-in-water emulsion gave a moist tasting cake, which stayed moist even after one day.

The inclusion of HFCS and EC-25 ® in Shortening B resulted in improved volume and nicer grain character. Overall the cake prepared with Shortening B was much better than the cake prepared with Shortening A. Also, oil-in-water emulsion gave better results.

TABLE 1

CONTROL MARGARINE AND 35% FAT EMULSION FORMULATION

| Ingredients | Control Margarine Percentages | Shortening A Percentages | Shortening B Percentages |
|---|---|---|---|
| Oil Phase: | | | |
| CREAMTEX ® | 79.50 | 31.00 | 15.00 |
| Mono Di 1892 ® | 0.10 | 1.00 | — |
| Flake Mono Di ® | — | 1.00 | — |
| Lecithin | 0.40 | 2.00 | — |
| EC-25 ® | — | — | 20.00 |
| Water Phase: | | | |
| Paselli SA2 ® | — | 16.25 | 13.00 |
| Salt | 1.50 | 1.50 | — |
| Sugar | — | 16.25 | — |
| HFCS | — | — | 19.50 |
| Whey | 0.10 | — | — |
| Citric Acid | 0.01 | — | — |
| Potassium Sorbate | 0.10 | — | — |
| Water | 8.10 | 31.00 | 32.50 |
| Flavors: | | | |
| Vanilla | 0.10 | | |
| Lemon | 0.20 | | |

EXAMPLE 4

25% Fat (Oil in Water)

The 25% fat (oil-in-water) shortening substitute was prepared as described above. The formula is listed in Table 2 as Shortening C. In order to make the shortening microbiologically safe salt, potassium sorbate and citric acid (pH 5.0) were added to the formula. Shortening C contained 7.1–8.3% total emulsifier.

Pound cake made with Shortening C had slightly higher volume than the pound cake prepared with Shortening B (listed in Table 1). The grain structure and eating characteristics were also good.

TABLE 2

25% AND 20% FAT CONTAINING EMULSION FORMULATIONS

| Ingredients | Shortening C Percentages | Shortening D Percentages | Shortening E Percentages |
|---|---|---|---|
| Oil Phase: | 25.00 | 20.00 | 20.00 |
| CREAMTEX ® | 12.50 | 10.00 | 10.00 |
| EC-25 ® | 12.50 | 10.00 | 10.00 |
| Water Phase: | 75.00 | 80.00 | 80.00 |
| Paselli SA2 ® | 12.50 | 16.00 | — |
| N-oil instant | — | — | 16.00 |
| HFCS | 24.75 | 26.40 | 26.40 |
| Salt | 1.50 | 1.6 | 1.60 |
| Citric Acid | 0.04 | 0.04 | 0.04 |
| Potassium Sorbate | 0.13 | 0.13 | 0.13 |
| Water | 36.00 | 36.00 | 36.00 |
| Flavors: | | | |
| Vanilla | 0.10 | 0.10 | 0.10 |
| Lemon | 0.20 | 0.20 | 0.20 |
| Color: | B-Carotene, optional. | | |

EXAMPLE 5

20% Fat (Oil in Water)

Further experiments were conducted to optimize the level of EC-25 ® and Creamtex ® blend. 1:1 proportion was found to be the best.

In order to achieve 80% reduction of the fat content in a cake, a shortening substitute containing 20% fat phase was prepared. The physical consistency after one day in the refrigerator was close to all purpose baker's shortening. The 20% formula is listed in Table 2 as Shortening D. Shortening D contained 5.7–6.6% total emulsifier.

The product prepared with Shortening D was compared with the product prepared with the Control margarine. The cake batter specific gravity was 0.82–0.86 for Shortening D vs. 0.84–0.88 for that of control. The specific volume (volume/weight) of the cake for Shortening D was 2.4–2.5 whereas the specific volume for control was 2.3–2.4. Also the eating characteristics for both the cakes were very close.

The example illustrates that the shortening substitute according to the invention, even when containing only 20% fat phase, can be used to replace all the fat from the pound cake recipe and still make comparable cake to the full-fat product.

EXAMPLE 6

Viscosifier Evaluation

Paselli-SA2 ®, N-oil ® and N-oil Instant ® were evaluated in making shortenings of formula D and eventually baking the cakes with it. The cakes made by all these three samples were very similar in terms of volume and grain but the eating quality of the cake made with N-oil Instant ® was much better.

Using N-oil Instant ® for making 20% fat shortening substitute resulted in the best overall product. The formula with N-oil Instant ® is listed in Table 2 as Shortening E. Shortening E contained 5.7–6.6% total emulsifier.

EXAMPLE 7

Creaming Property

Shortening D was evaluated for creaming property by mixing the shortening with equal amounts of sugar in a Hobart mixer. The specific gravity was measured after 1, 3, 5, 10 and 15 minute of mixing. It resulted in specific gravity of 0.94, 0.85, 0.82, 0.78 and 0.77 respectively. FIG. 1 is a graph showing % air against mixing time. It shows that shortening has capability of aerating and hence, it can be used as a shortening replacement and also can be used for making icing or any other product which requires air.

EXAMPLE 8

Pound cakes containing various emulsions listed in Table 3 were prepared.

TABLE 3

| | Emulsions | | | | | |
|---|---|---|---|---|---|---|
| | I | II | III | IV | V | VI |
| Creamtex ® | 10.00 | | 10.00 | 10.00 | 10.00 | 5.00 |
| EC-25 ® | 10.00 | 10.00 | 10.00 | 10.00 | 7.00 | 5.00 |
| N-oil instant ® | 16.00 | 18.00 | 16.00 | 16.00 | 18.60 | 18.00 |
| Lo-Dex 10 ® | 17.50 | | | | 20.30 | |
| Lo-Dex 15 ® | | | 18.00 | | | |
| Lo-Dex 36 ® | | | | 19.00 | | |
| Glycerol | | | | | | 10.00 |
| Litesse ® | | 19.80 | | | 18.00 | 10.00 |
| Salt | 1.60 | 1.60 | 1.60 | 1.60 | 1.60 | 1.60 |
| Citric acid | 0.04 | 0.04 | 0.04 | 0.04 | 0.04 | 0.00 |
| P. Sorbate | 0.13 | 0.13 | 0.13 | 0.13 | 0.13 | 0.13 |
| Flavor firmenich | 0.05 | 0.05 | 0.05 | 0.05 | 0.05 | 0.06 |
| Color | 0.01 | 0.01 | 0.01 | 0.01 | 0.01 | 0.006 |
| Water | 44.67 | 50.37 | 44.17 | 43.17 | 48.17 | 50.17 |
| Total | 100.00 | 100.00 | 100.00 | 100.00 | 100.00 | 100.00 |

Pound cake evaluations results were as follows:

| Emulsion | Pound Cake Specific Volume |
|---|---|
| I | low |
| II | low |
| III | medium |
| IV | medium |
| V | high |

No cake was prepared with emulsion VI. The consistency of emulsion VI was softer than the consistency of the emulsion prepared with high fructose corn syrup (e.g., Shortenings D and E).

Materials and Suppliers employed in the Examples:

Creamtex ®: Partially hydrogenated soybean and cottonseed oil manufactured by VDBF, Joliet.

EC-25 ®: An emulsifier concentrate consisting of Propylene Glycol Monoester (PGME) 34–38% Alpha Monoglyceride 20–25% Lecithin Manufactured by VDBF, Joliet Lecithin: Obtained from Central Soya Corp.

Mono: Saturated 40% monoglyceride, Van den Bergh Foods

Diglyceride: Unsaturated distilled (90% pure) (Myverol 1892 ® from Eastman Kodak)

Paselli SA2 ®: Potato starch manufactured by Avebe America, Inc.

N-oil ®: Tapioca starch manufactured by National Starch Co.

N-oil Instant ®: Pregelatinized tapioca starch manufactured by National Starch Co.

HFCS: 42 DE High Fructose Corn syrup. Hubinger Co.

Lo-Dex 10 ®: Starch hydrolyzate with a DE of less than 10, obtained from American Maize Corp.

Lo-Dex 15 ®: Starch hydrolyzate with a DE of less than 15, obtained from American Maize Corp.

Lo-Dex 36 ®: Starch hydrolyzate with a DE of less than 36, obtained from American Maize Corp.

Litesse ®: Randomly bonded condensation polymer of dextrose, containing minor amounts of bound sorbitol and citric acid, obtained from Pfizer Inc., Specialty Chemical Div.

It should be understood that the specific forms of the invention herein illustrated and described are intended to be representative only. Changes, including but not limited to those suggested in the specification, may be made in the illustrative embodiments without departing from the clear teachings of the disclosure. Accordingly, reference should be made to the following appended claims in determining the full scope of the invention.

What is claimed is:

1. A shortening substitute for the preparation of a bakery product, wherein the shortening substitute is in the form of an emulsion comprising:
   from about 10% to about 40% of a fat phase comprising
   (a) a triglyceride;
   (b) at least 3%, by weight of the emulsion, of an emulsifier, the emulsifier comprising at least 45%, by weight of the emulsifier, of propylene glycol monoester of fats and fatty acids; and
   from about 60% to about 90% of an aqueous phase comprising
   (c) from about 5% to about 30%, by weight of the emulsion, of a viscosifier selected from the group consisting of a starch, a starch derivative, a gum, and mixtures thereof; and
   (d) from about 10% to about 50%, by weight of the emulsion, of a polyol humectant.

2. The emulsion of claim 1 wherein the emulsion is an oil-in-water emulsion.

3. The emulsion of claim 1 wherein the emulsion contains from about 15% to about 35% of the fat phase and from about 65% to about 85% of the aqueous phase.

4. The emulsion of claim 1 wherein the emulsifier contains 30–45% alpha monoglyceride and 45–70% propylene glycol monoester, by weight of the emulsifier.

5. The emulsion of claim 4 wherein the emulsifier further contains lecithin.

6. The emulsion of claim 1 wherein the fat content of the emulsion is no greater than 20%.

7. The emulsion of claim 1 wherein the ratio of the triglyceride to the emulsifier is from about 4:1 to about 1:1.

8. The emulsion of claim 1 wherein the ratio of the triglyceride to the emulsifier is about 2.3:1.

9. The emulsion of claim 1 wherein the triglyceride has a solid fat index as follows:

| 50° F. | 20–70 |
|---|---|
| 70° F. | 10–60 |
| 92° F. | 5–50 |
| 104° F. | 1–20. |

10. The emulsion of claim 1 wherein the emulsifier is a mixture of propylene glycol monoester of fats and fatty acids, mono- and diglycerides and lecithin.

11. The emulsion of claim 1 wherein the viscosifier is selected from the group consisting of maltodextrin, tapioca dextrin, and pregelatinized tapioca dextrin.

12. The emulsion of claim 1 wherein the humectant is selected from the group consisting of hydrolyzed corn starches.

13. The emulsion of claim 1 wherein the humectant is high fructose corn syrup.

14. A dough or a batter composition comprising the emulsion of claim 1.

15. An icing for a bakery product comprising the emulsion of claim 1.

* * * * *